(12) United States Patent
Verpoest

(10) Patent No.: US 6,184,161 B1
(45) Date of Patent: Feb. 6, 2001

(54) METHOD FOR OBTAINING A THREE-DIMENSIONAL TEXTILE PRODUCT, THREAD USED THEREIN, COMPOSITE MATERIALS OBTAINED WITH THIS THREAD AND ACCORDING TO THIS METHOD

(75) Inventor: Ignaas Verpoest, Leuven (BE)

(73) Assignee: Katholieke Universiteit Leuven, Leuven (BE)

( * ) Notice: Under 35 U.S.C. 154(b), the term of this patent shall be extended for 0 days.

(21) Appl. No.: 08/930,499

(22) PCT Filed: Apr. 4, 1996

(86) PCT No.: PCT/BE96/00036
§ 371 Date: Mar. 26, 1998
§ 102(e) Date: Mar. 26, 1998

(87) PCT Pub. No.: WO96/31336
PCT Pub. Date: Oct. 10, 1996

(30) Foreign Application Priority Data

Apr. 4, 1995 (BE) .................................................. 9500309

(51) Int. Cl.$^7$ .............................. B29C 70/24; D02G 3/36
(52) U.S. Cl. .................... 442/199; 442/189; 442/190; 442/191; 442/192; 442/199; 427/209; 427/322; 427/421; 427/430.1

(58) Field of Search ................................. 428/221; 442/4, 442/43, 46, 47, 50, 51, 181, 304, 189, 190, 191, 192, 199; 156/60, 148; 427/209, 322, 421, 430.1; 28/108, 109

(56) References Cited

FOREIGN PATENT DOCUMENTS

WO 94 01272 * 1/1994 (DE) .

* cited by examiner

*Primary Examiner*—Richard Weisberger
(74) *Attorney, Agent, or Firm*—Dorsey & Whitney LLP

(57) ABSTRACT

The present invention relates to a method for manufacturing a three-dimensional textile product, characterized in that at least the pile thread of which is subjected to one or more of the following textile treatments: a) the textile thread is enveloped; b) several textile threads are added to the textile thread; c) the textile thread is structured by making use of at least one monofilament and at least one multifilament; d) the textile thread is structured by making use of at least one monofilament and at least one multifilament thread of thermoplastic fibres; e) each of the textile treatments mentioned in points a–d are performed under such circumstances that the textile thread is kept sufficiently flexible during a first textile treatment and can be stiffened in a subsequent treatment.

20 Claims, 2 Drawing Sheets

METHOD FOR OBTAINING A THREE-DIMENSIONAL TEXTILE PRODUCT, THREAD USED THEREIN, COMPOSITE MATERIALS OBTAINED WITH THIS THREAD AND ACCORDING TO THIS METHOD

RELATED APPLICATIONS

This application claims the priority of PCT Application No. PCT/BE96/00036, filed Apr. 4, 1996, and Belgium Application No. 9500309, filed Apr. 4, 1995, which are incorporated herein by reference.

BACKGROUND OF THE INVENTION

This invention relates to a method for manufacturing a three-dimensional textile product obtained in the form of a knitted fabric, a woven fabric or a technique suited therefor.

Textile products of the intended type are thoroughly described i.a. in patent application PCT/BE93/0048. They can be used as such or as reinforcement in composite materials.

Three-dimensional knitted fabrics or three-dimensional woven fabrics, as described in this application, specifically show a certain indentation stiffness, in other words a resistance against a movement of both woven or knitted fabric surfaces towards one another, which characterise these textile products.

It will be noted in passing that, besides knitted and woven fabrics, three-dimensional textile products can also be produced by braiding, tufting, sewing, etc. In the following description and claims, these different techniques will therefore be clarified by the expression "textile processing".

The stiffness of the textile product is mainly dependent of the stiffness of the used pile thread, of the density of these pile threads and of the cross, i.e. perpendicular, obliquely or in section relation, as well as of the height of the pile threads, i.e., the distance between both of said surfaces of the textile product.

In order to increase the stiffness of a three-dimensional textile product for a given pile height, use is made of a stiffer thread or a higher density of these pile threads is applied, and this with the adequate crossing.

By this way of treatment, one is however faced with several problems, the most important of which can be described as follows: the higher the stiffness of the pile thread, the worse the weaving or knitting properties of the product, i.e. with the hereinabove mentioned textile treatment. When applying other production possibilities, the application of pile threads of this too high stiffness has also very adverse consequences.

SUMMARY OF THE INVENTION

An object of the invention is to provide textile threads, i.a. pile threads, which are sufficiently flexible and which can thus be applied in high densities. With a finishing treatment which pertains to the essence of the invention, the threads, i.a. the pile threads, are stiffened without having to fill up the distance between the above mentioned surfaces of the textile product, for example with foam.

In the following examples, pile threads, their structure, their preliminary and finishing treatment will be described and this in function of the essential role which has to be fulfilled by these pile threads in a three-dimensional textile product of the hereinabove described type. On the other hand, textile threads which do not have the function of pile threads, but which can be found only in the outer layers, may show the same structure and may have been subjected to the same preliminary or finishing treatment. The expression "pile thread" will thus never have to be interpreted in a narrow sense. They can thus contribute to an increase of for example the bending stiffness and the bending strength of said three-dimensional textile products and/or their composites.

To achieve the objects mentioned in the preamble, at least the textile thread which is destined as pile thread for this textile product is subjected to one or more of the following textile treatments:

a) the textile thread is enveloped;

b) several textile threads are added to the textile thread;

c) the textile thread is structured by making use of at least one monofilament and at least one multifilament;

d) the textile thread is structured by making use of at least one monofilament and at least one multifilament thread which consists at least partially of thermoplastic fibres;

e) each of the textile treatments mentioned in points a–d are performed under such circumstances that the textile thread is kept sufficiently flexible during a first textile treatment such as three-dimensional knitting or three-dimensional weaving and can be stiffened in a subsequent treatment such as thermoforming, melting together or impregnating with a matrix.

Other advantages and properties of the invention will become apparent from the following description of a textile thread, i.a. a pile thread, especially but not exclusively for use in three-dimensional textile products, according to the invention. This description is only given by way of example and does not limit the invention. The reference numerals relate to the figures annexed thereto all of which showing sections, on a very enlarged scale, of textile threads, i.a. pile threads according to the invention in different embodiments.

DETAILED DESCRIPTION OF THE PREFERRED EMBODIMENTS

The embodiments illustrated by these different figures and selected only by way of example are thus examples of possible textile threads, i.a. pile threads or fibre assemblies comparable therewith which meet the objects set forth in the preamble. The invention will now be described mainly with respect to the manufacture of a three-dimensional textile product, the pile threads of which being stiffened. Fundamentally, the invention relates indeed to producing and applying sufficiently flexible pile threads which can be applied in high densities and which can be stiffened without having to fill up the distance between the layers of the three-dimensional textile product, for example with foam. An advantage of the thus obtained product is of course its good air permeability. One or more monofilaments or multifilament threads having a small number of filaments (2 to 50) can be spun around, intermingled, twisted, braided together, knitted, cabled or assembled by means of other possible techniques by making use of a material which provides at the same time a good adhesion between the different components after which the textile process (three-dimensional knitting, weaving, tufting, sewing, etc.) is completed.

In order to prevent shifting with respect to stiffer materials, such as this may occur with monofilaments having an enveloped spun therearound, the core, consisting for example of a PET monofilament, may be roughened or the envelope may be glued to and/or melted together with the monofilament, serving as core yarn. It is also possible to process two or more of these spun around, twined around, knitted around yarns together once more before proceeding with weaving, knitting, braiding, tufting, etc. to obtain the three-dimensional textile product discussed in the preamble.

The pile thread can thus be hardened or stiffened by hardening the pile material during a finishing treatment after the textile treatment by adding a resin or by melting the envelope having a lower melting point and allowing this envelope to solidify afterwards.

It is also possible to pass one of the used yarns, filament yearns or spun yarns before the weaving process first through a bath with a dipping material which provides after drying at about 110° C. a still sufficiently flexible pile yarn. Upon a subsequent thermofixing, after a textile processing at a temperature of about 160–180° C., the pile thread is harder and stiffer. An example thereof is a treatment of the yarn in a bath of acrylic. It is clear that, besides an acrylic material, numerous other technically equivalent synthetic materials can be considered.

With respect to the figures annexed hereto, the following can thus be said.

Figure 1:
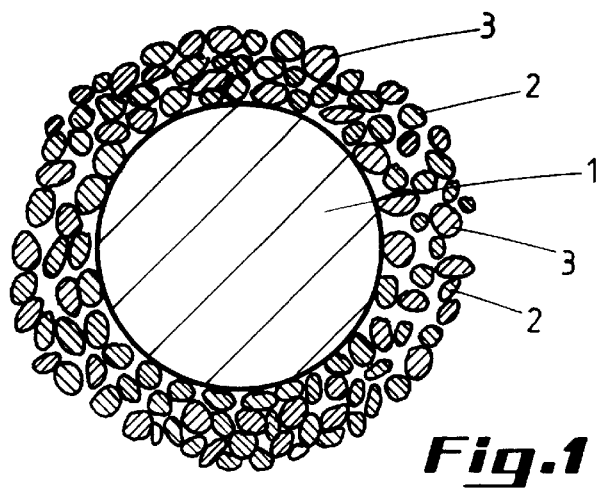
FIG. 1 relates to a monofilament having an envelope of natural fibres and/or synthetic fibres.

In FIG. 1, a monofilament 1 is wound around with an enveloped consisting of the same weight of ramie and viscose. The knitted fabric or the textile product obtained according to another technique is subsequently treated with a resin and gives a much larger stiffness than when use is made of a thicker monofilament. In this figure, the synthetic fibres are indicated with reference 2 and the natural fibres with reference 3. The monofilament 1 may consist of PET, PA 6, PA 66, PA 46, PA 12, PVC, PP, PE, PEI, PAI, and technically equivalent materials. The synthetic fibres 2 are fibres to which i.a. PA 6, PA 66, PE, PET, PA 12, PA 46, PP, etc. pertain. Examples of natural fibres 3 include ramie, flax, cotton, jute, sisal and technically equivalent natural fibres. Synthetic fibres, such as viscose may also be taken into consideration.

Figure 2:
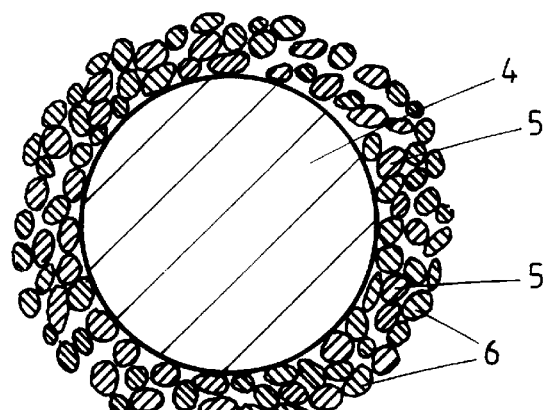
FIG. 2 relates to a monofilament having an envelope of polyester fibres with a low melting point and polyester fibres with a high melting point.

The pile thread according to FIG. 2 consists of a monofilament 4 having an envelope of polyester fibres 5 with a high melting point (about 256° C.) whereas the fibres 6 are polyester fibers with a low melting point (about 110° C). After knitting or after another textile treatment, the whole is thermofixed at a temperature of about 220° C. and the envelope is melted to the monofilament which forms the core yarn. Also here, a strongly increased stiffness of the three-dimensional textile product is to be expected.

Figure 3:
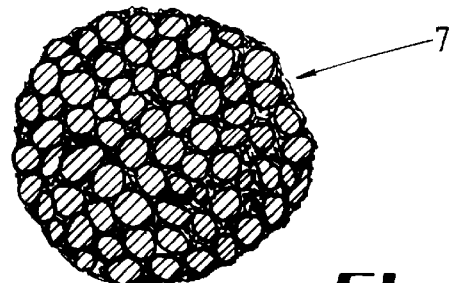
FIG. 3 concerns glass yarn filaments bound in acrylic resin.

In FIG. 3, a multifilament glass yarn 7 is shown which is previously impregnated with an acrylic resin or a technically equivalent resin, in such a manner that an uptake of about 20% in weight of this material is obtained. This thread is dried at a temperature of about 110° C. and is thermofixed after knitting at a temperature of about 160 to 180° C. This results in a stiff three-dimensional knitted fabric. The herein described treatment and the obtained filament permit to obtain a sufficiently flexible thread during knitting. This is to due to the fact that, after a drying process at about 110° C., the polyacrylic resin is not completely hardened yet, so that a three-dimensional textile product (three-dimensional knitted fabric) can be obtained with the desired density and pile height. Only after thermofixing at a temperature of about 180° C., the desired stiffness of the three-dimensional material is obtained.

Figure 4:
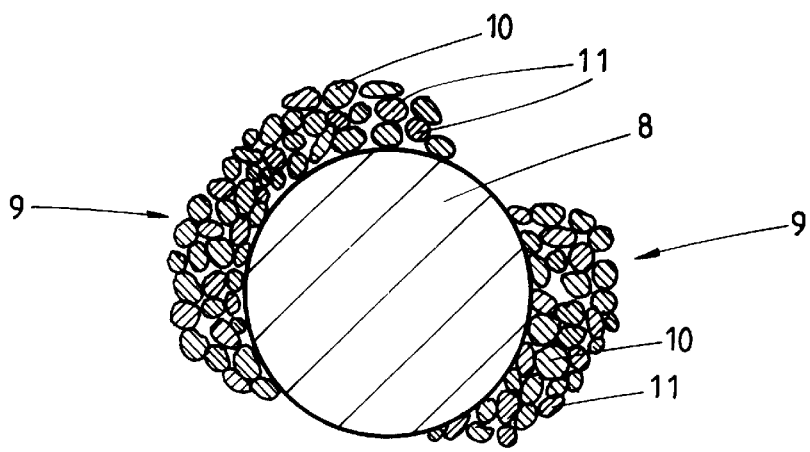
FIG. 4 concerns a monofilament twined together with two threads of spun bi-component PET yarn.

In FIG. 4, a monofilament 8, consisting for example of a PET thread of 18 micrometer twined together with two threads of spun bi-component PET yarn 9, is shown. The bi-component threads 9 consist of PET fibres 10 with a high melting point and PET fibres 11 with a lower melting point. The thread shown here is a twined thread consisting of a monofilament PET thread (18 micrometer) twined together with two bi-component PET threads 10 and 11. The applied twist comprises 120 t/m. The threads obtained in this way are woven into a three-dimensional woven fabric, the surface threads of which consist for example of 167 dtex PET FTF. The monofilament 8 is this assembly assures that a sufficient distance is maintained between the two woven surface fabrics of the three-dimensional textile product. After thermofixing at a temperature of about 200° C., a sufficient stiffness is obtained at a velocity of 20 m/min, and a zone length of 20 m, which corresponds to an exposure of 1 min., to use the obtained woven fabric as a stiff three-dimensional material.

Figure 5:
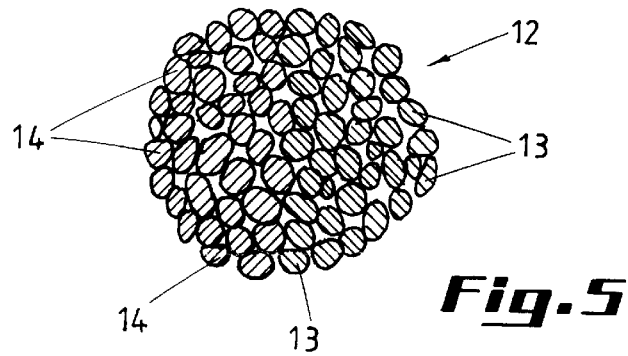
FIG. 5 concerns a continuous glass thread with a multifilament yarn assembled and/or slightly twined into a yarn, i.a. a pile yarn.

FIG. 5 shows a continuous glass thread 12 obtained by assembling glass fibres 13 with fibres 14 of another yarn. Such a yarn can be tufted on a base layer and after raising, the multifilament yarn which has a lower melting point than the base layer, is heated to melt, whilst the base layer does not melt. The result is a stiff tufted material meeting the objectives of the invention.

Figure 6:
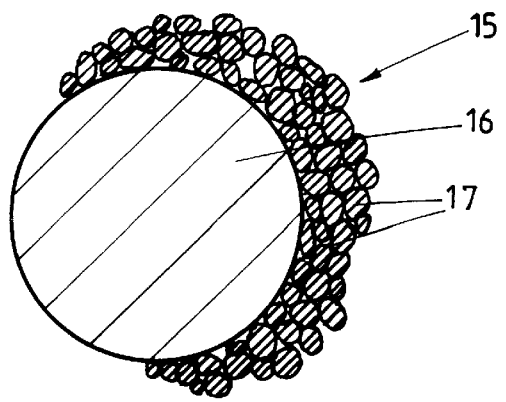
FIG. 6 concerns a glass thread with a slightly twined monofilament.

In FIG. 6, a glass thread 15 is finally shown consisting of a monofilament (20 tpm) having an envelope of glass thread fibres 17. By means of such a glass thread three-dimensional knitted fabrics can be obtained.

The fields wherein the different hereinabove described products can be employed, can be subdivided as follows:

a) sports products, such as helmets, protective jackets (for example for hockey players), legguards, knee and ankle pads, soles for sports shoes, saddles, blankets for horses, sports mat underlays, etc.;

b) safety products such as inner linings for protective jackets (bullet- or shrapnel-proof), insoles for safety and other shoes (for example boots), bumpers, etc.;

c) products for the protection of the environment such as vibration dampers, filtration applications, screening of machines and other noise and vibration sources, insulation materials, etc.;

d) building sector: applications such as floor underlays, walls including displaceable roof insulation, wall insulation;

e) tools such as light cases which have to be insulated from heat and impact, brake plates, clutches.

The invention is not limited to the embodiments described hereinabove and a lot of modifications could be applied thereto, insofar as they fall within the scope of the claims annexed hereto.

What is claimed is:

1. A three-dimensional textile product comprising:

two textile layers with pile threads therebetween, the space between the two layers being free of bulk material;

the pile thread comprising a textile thread, the textile thread being an assembled combination of at least one monofilament and at least one multifilament or one monofilament and an enveloped of fibres; and the pile thread being impregnated with a resin.

2. The textile product according to claim 1, wherein said at least one multifilament thread consists partially of thermoplastic fibres.

3. The textile product according to claim 1, wherein both the monofilament and the multifilament is spun around with a bi-component yarn, in weight ratios of about 50/50, which filaments are twined together in a second step.

4. The textile product according to claim 3, wherein the bi-component yarn comprises a first component at the surface having a melting point lower than that of the second component which is situated in the interior of the bi-component yarn.

5. The textile product according the claim 1, wherein the monofilament and the multifilament are spun around, intermingled, twisted, braided together, knitted or cabled.

6. The textile product according to claim 1, wherein the textile thread consists of at least one synthetic monofilament with an enveloped consisting of at least partially of natural fibres.

7. The textile product according to claim 6, wherein the synthetic material is a material chosen from the group consisting of PET, PA 6, PA 66, PA 46, PA 2, PVC, PP, PE, PEI, PAI.

8. The textile product according to claim 7, wherein the monofilament and the multifilament are twined together with at least two threads of spun bi-component yar.

9. The textile product according to claim 1, wherein the textile thread consists of at least one glass thread slightly twined with a monofilament.

10. A method for manufacturing a three-dimensional textile product including knitted fabrics and woven fabrics, the textile product having two textile layers with pile threads therebetween, comprising the steps of:

a) providing a textile thread assembled from a combination of at least one monofilament and at least one multifilament or a monofilament with an envelope of fibers, the filament diameter of the multifilament and the fiber diameter of the envelope of fibers being smaller in diameter than the monofilament;

b) manufacturing the two textile layers with the pile threads therebetween to thereby space the two textile layers apart from each other, wherein the pile threads include the textile thread and textile thread is flexible;

c) stiffening the pile threads; and d) impregnating the textile thread with a resin during the providing step or impregnating the pile threads with a resin during the stiffening step.

11. The method according to claim 10, wherein said textile thread consists of a thermoplastic material.

12. The method according to claim 10, wherein said at least one multifilament thread consists partially of thermoplastic fibres.

13. The method according to claim 10, wherein the textile thread consists of a least one synthetic monofilament with an envelope consisting of at least partially of natural fibres.

14. The method according to claim 13, wherein said synthetic material is a material chosen from the group consisting of PET, PA 6, PA 66, PA 46, PA 12, PVC, PP, PE, PEI, PAI.

15. The method according to claim 10, wherein both the monofilament and the multifilament is spun around with a bi-component yarn, in weight ratios of about 50/50, which filaments are twined together in a second step.

16. The method according to claim 15, wherein said bi-component yarn comprises a first component at the surface having a melting point lower than that of the second component which is situated in the interior of the bi-component yarn.

17. The method according to claim 15, wherein the monofilament and the multifilament are twined together with at least two threads of spun bi-component yarn.

18. The method according to claim 10, wherein the textile thread consists of at least one glass thread twined with a monofilament.

19. The method according to claim 10, wherein the monofilament and the multifilament are spun around, intermingled, twisted, braided together, knitted or cabled.

20. The method according to claim 10, wherein the space between the two textile layers is free of filling material.

* * * * *